United States Patent [19]

Beard

[11] Patent Number: 5,546,468
[45] Date of Patent: Aug. 13, 1996

[54] PORTABLE SPEAKER AND AMPLIFIER UNIT

[76] Inventor: Michael H. Beard, 3209 N. Tulsa Dr., Deltona, Fla. 32738

[21] Appl. No.: 237,882

[22] Filed: May 4, 1994

[51] Int. Cl.$^6$ .................................................. H04B 1/00
[52] U.S. Cl. ............................ 381/86; 381/24; 381/188; 381/28; 381/205; 181/145
[58] Field of Search .............................. 381/28, 24, 188, 381/86, 89, 205, 87, 88, 90, 2; 455/345; 181/144, 145

[56] References Cited

U.S. PATENT DOCUMENTS

| | | |
|---|---|---|
| 3,405,944 | 10/1968 | Krechman . |
| 3,858,679 | 1/1975 | Askins ................................ 181/145 |
| 3,883,195 | 5/1975 | Walker . |
| 4,020,284 | 4/1977 | Phillips ................................ 381/2 |
| 4,179,585 | 12/1979 | Herrenschmidt ..................... 381/188 |
| 4,572,325 | 2/1986 | Schupbach ........................... 181/145 |
| 4,837,826 | 6/1989 | Schupbach ........................... 381/24 |
| 4,888,804 | 12/1989 | Gefvert ................................ 381/24 |
| 5,046,104 | 9/1991 | Kloss . |
| 5,094,316 | 3/1992 | Rosen . |
| 5,146,618 | 9/1992 | Wenner ................................ 455/345 |
| 5,228,090 | 7/1993 | Marler . |

Primary Examiner—Curtis Kuntz
Assistant Examiner—Minsun Oh
Attorney, Agent, or Firm—Richard C. Litman

[57] ABSTRACT

A combination speaker and amplifier unit has speaker located on the front of a cabinet and speaker wire receptacles located in the back of the cabinet for providing speaker wire connections to a stereo unit. Also in the back of the cabinet is a power booster amplifier mounted thereon for amplifying the left and right stereo signals provided by the stereo unit. A power cable extends out the base of the power booster amplifier which is mounted to a cut-out section of the back of the cabinet so as to place the power booster amplifier within the cabinet. The power cable has a cigarette lighter adapter plug allowing the power booster amplifier to by powered by the power supplied to the cigarette lighter socket of an automobile.

8 Claims, 5 Drawing Sheets

4,546,468

PORTABLE SPEAKER AND AMPLIFIER UNIT

BACKGROUND OF THE INVENTION

1. Field of the Invention

The present invention relates to a portable speaker and amplifier unit for use in automobiles, trucks, or other vehicles. More particularly, the present invention pertains to such a unit having a single cabinet housing for the enclosure of a set of three-way speakers having a separation wall located therebetween to divide the cabinet into two separate acoustic chambers to provide channel separation, the cabinet further including a built-in stereo audio amplifier located in the back of the cabinet and inserted into one of the acoustic chambers.

2. Description of the Prior Art

U.S. Pat. No. 3,405,944 issued Oct. 15, 1968 to David Krechman discloses a tape player and loudspeaker assembly which may rest on the floor of the front seat of an automobile.

U.S. Pat. No. 3,883,195 issued May 13, 1975 to Thomas A. Walker discloses a speaker cabinet configuration which includes a speaker mounted therein along the front wall of the cabinet. A control panel is located along the front wall of the cabinet above the speaker to allow the user to adjust electronic components located within the cabinet.

U.S. Pat. No. 5,094,316 issued Mar. 10, 1992 to Christer Rosen discloses an overhead speaker system adapted to be mounted to opposing lintels of a vehicle. The speaker system includes an elongated support member housing speakers at both ends thereof and a stereo unit in a middle portion thereof.

U.S. Pat. No. 5,046,104 issued Sep. 3, 1991 to Henry E. Kloss discloses a portable loudspeaker system having a housing made from a hard outer shell for enclosing at least one woofer on the front side thereof. Further, compartments are provided within the housing for storing for transport an amplifier, a pair of speakers, and a sound source, such as a portable compact disc player or the U.S. Pat. No. 5,228,090 issued Jul. 13, 1993 to Michael K. Marler discloses a speaker housing which can be mounted within a truck's rear window.

None of the above inventions and patents, taken either singly or in combination, is seen to describe the instant invention as claimed.

SUMMARY OF THE INVENTION

The speaker and amplifier unit of the present invention includes a portable cabinet for containing a set of left and right speakers along with a power booster amplifier to amplify the signal going to the speakers. The cabinet has a front wall, a back wall, two side walls, and a top and bottom. The left and right speakers are located on the front wall. The right speakers are located on the right side of the cabinet and the left speakers are located on the left side of the cabinet. A divider wall is located within the cabinet between the left and right side walls to divide the interior section of the cabinet into left and right chambers, thereby acoustically isolating the speakers on the right side of the cabinet from those on the left side of the cabinet.

A right channel speaker wire receptacle is located on the back wall of the cabinet on the right side thereof and a left channel speaker wire receptacle is located on the back wall of the cabinet on the left side thereof. A back wall cut-out is located on the back wall. The booster is mounted on a base and the base is mounted over the back wall cut-out so as to place the booster within the interior section of the cabinet. A power cord extends from the bottom of the base mounted to the back wall and provides power to the power booster amplifier when connected to a power source. For example, the power cord may be attached to a cigarette lighter adaptor plug so as to allow the power cord to provide power to the power booster amplifier supplied by the power provided to a cigarette lighter socket of an automobile.

Accordingly, it is a principal object of the invention to provide a portable speaker unit having a power booster amplifier associated therewith.

It is another object of the invention to provide channel separation within the cabinet by providing a divider wall therein between the left and right sides of the cabinet.

It is a further object of the invention to provide a combination speaker and amplifier unit which may be readily attached to the sound system of an automobile.

Still another object of the invention is to provide a power cord for the power booster amplifier which may be readily attached to a power supply of an automobile.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
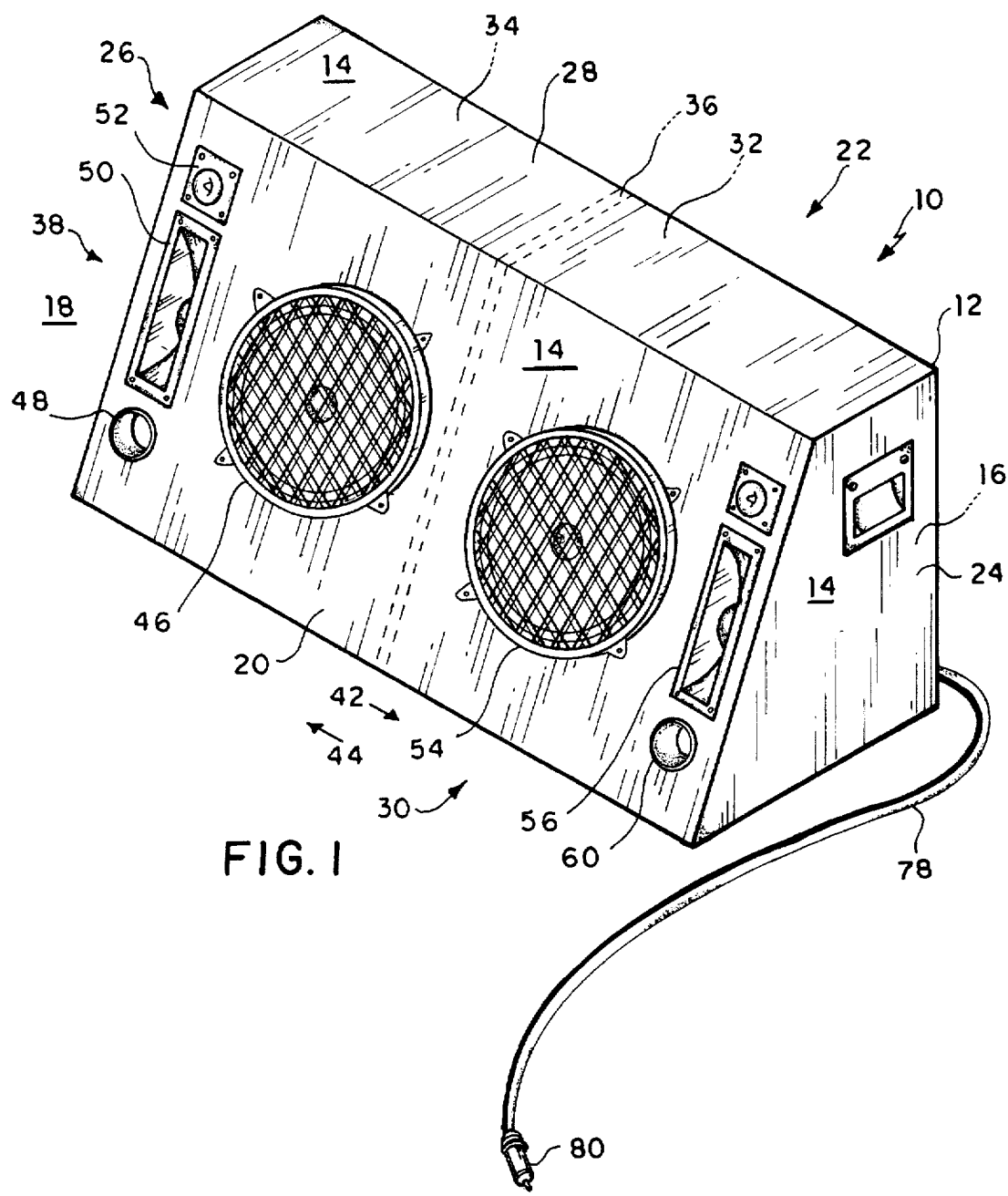
FIG. 1 is a front perspective view of a first embodiment.

As illustrated in FIG. 1, a first embodiment of the portable speaker and amplifier unit 10 includes a cabinet 12 having an outer housing 14 separating an interior section 16 of the cabinet from the exterior 18 of the cabinet 12. The outer housing 14 of the cabinet 12 includes a slanted front wall 20, an upright back wall 22, an upright left side wall 24, an upright right side wall 26, a top cover 28, and a bottom base 30. The interior section 16 of the cabinet 12 includes left and right chambers 32 and 34 separated by an upright divider wall 36 located halfway between the left side wall 24 and the right side wall 26. A plurality of speakers 38 are mounted on the front wall 20 through cutout portions 40 (see FIG. 2) which extend through the front wall 20 from the exterior 18 to the interior section 16 of the cabinet 12. The back of each of the speakers extend within the interior section of the cabinet and the front of each of the speakers is located along the exterior of the cabinet.

An equal number of speakers are located within said left chamber 32 on the left hand side 42 of the outer housing 14 as are located within said right chamber 34 on the right hand side 44 of the cabinet 12. The divider wall 36 acoustically isolates those speakers 38 located on the left hand side 42 of the cabinet 12 from those on the right hand side 44 of the cabinet 12. The speakers 38 on the left hand side 42 are adapted to receive a left channel stereo signal from an external source while the speakers 38 on the right hand side 44 are adapted to receive a right channel stereo signal from an external source. Thus, the divider wall 36 provides for increased stereo channel separation by acoustically isolating the left and right chambers 32 and 34.

As illustrated in FIG. 1, a right channel woofer 46 is located on the right side 44 of the cabinet 12 for providing low frequency audio signal reproduction in the base range of the right channel stereo signal to be reproduced. A right port 48 is provided to vent the right chamber 34. Two additional speakers 38 are provided above the port 48, one of them being a right channel midrange speaker 50 and the other a right channel tweeter 52. The right channel midrange speaker 50 is used for reproducing a midrange frequency portion of the right channel stereo signal, while the right channel tweeter 52 is used to reproduce the high frequency end of the right channel stereo signal.

On the left side 42 of the cabinet 12 there is a left channel woofer 54, a left channel midrange speaker 56, and a left channel tweeter 58 having the same construction as the right channel woofer 46, right channel midrange speaker 50, and the right channel tweeter 52, respectively. The left side 42 of the cabinet also includes a left port 60 to vent the left chamber 32. The speakers on the left side 42 of the cabinet 12 are connected to a different audio source than the speakers on the right side of the cabinet as described below.

Figure 2:
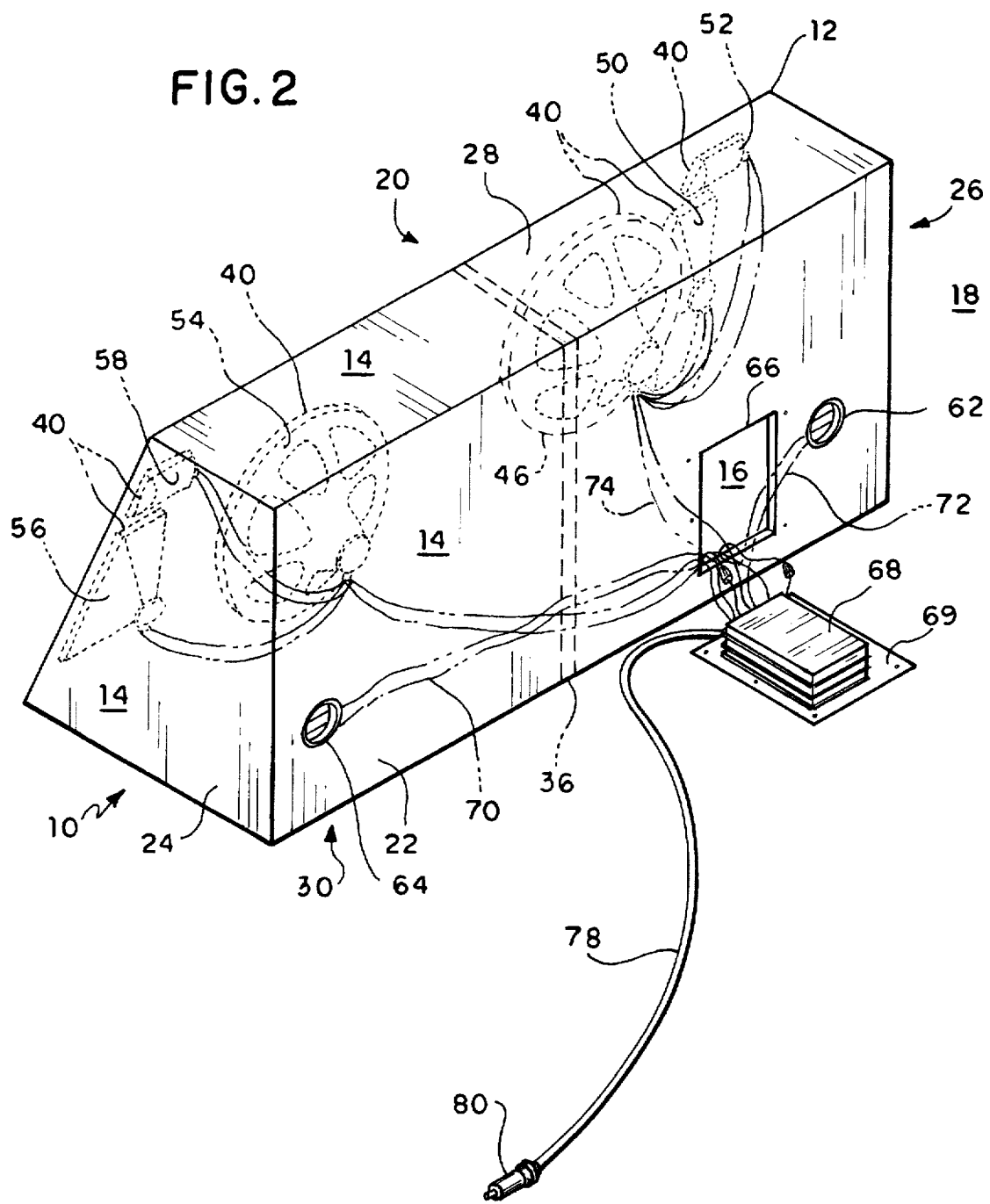
FIG. 2 is an isometric front view of the first embodiment.

As illustrated in FIG. 2, the back wall 22 includes a right speaker wire receptacle 62 and a left speaker wire receptacle 64. Both of the speaker wire receptacles 62 and 64 are used to accept speaker wires used by stereo units. A back wall cut-out 66 is located on the back wall 22 of the cabinet 12 on the right side 44 thereof and adjacent to the right speaker wire receptacle 62. The cut-out 66 extends from the exterior 18 of the outer housing 14 of the cabinet 12 into the right chamber 34 of the cabinet 12. A power booster amplifier 68 for amplifying stereo signals is used to receive the left and right channel inputs from the left speaker wire receptacle 64 and the right speaker wire receptacle 62. The power booster amplifier 68 has a base base 69 which is mounted to the back wall 22 of the cabinet 12 over the back wall cut-out 66 so as to place the power booster amplifier 68 within the right chamber 34 of the cabinet 12.

As illustrated in FIG. 2, the power booster amplifier 68 has left input wires 70 attached thereto and connected to the left speaker wire receptacle 64 and right input wires 72 attached thereto connected to the right speaker wire receptacle 62. The power booster amplifier 68 has right output wires 74 attached thereto and connected to the right channel woofer 46, the right channel midrange speaker 50, and the right channel tweeter 52. The power booster amplifier 68 also has left output wires 76 connected to the left channel woofer 54, the left channel midrange speaker 56, and the left channel tweeter 58. A power cord 78 extending from the base base 69 of the power booster amplifier 68 is used to supply electrical power to the power booster amplifier 68, enabling the power booster amplifier 68 to amplify the left and right stereo channel signals sent across speaker wires connected to the right and left speaker wire receptacles 62 and 64. Without electrical power being supplied to the power booster amplifier 68, the left and right stereo channels are not amplified by the power booster amplifier 68, but are sent directly to the speakers 38 (FIG. 1).

Modifications to the first embodiment as disclosed above may be made without departing from the scope of the present invention. For example, the power cord is shown to have a lighter plug 80 in FIG. 2 for allowing it to be inserted into the cigarette lighter of a car or other vehicle. However, the power cord could be connected to power from the fuse box of the vehicle. While the shape of the left and right sides of the cabinet housing is shown to be trapezoidal, other embodiments could have a square longitudinal cross-section, a round longitudinal cross-section, or a rectangular longitudinal cross-section. In the preferred embodiment, the cabinet housing is made of particle board with a felt covering. However, the cabinet housing could be made of opaque plastic material, clear transluscent or tinted plastic material, or fiberglass. If the cabinet housing is made of fiberglass or plastic material, the cabinet housing may be formed by injection molding. The cabinet housing may be laminated with felt, paper, vinyl, wood, plastic, or formica. The speaker and amplifier unit of the present invention may be assembled by hand, by machine, or by a combination thereof.

Figure 3:
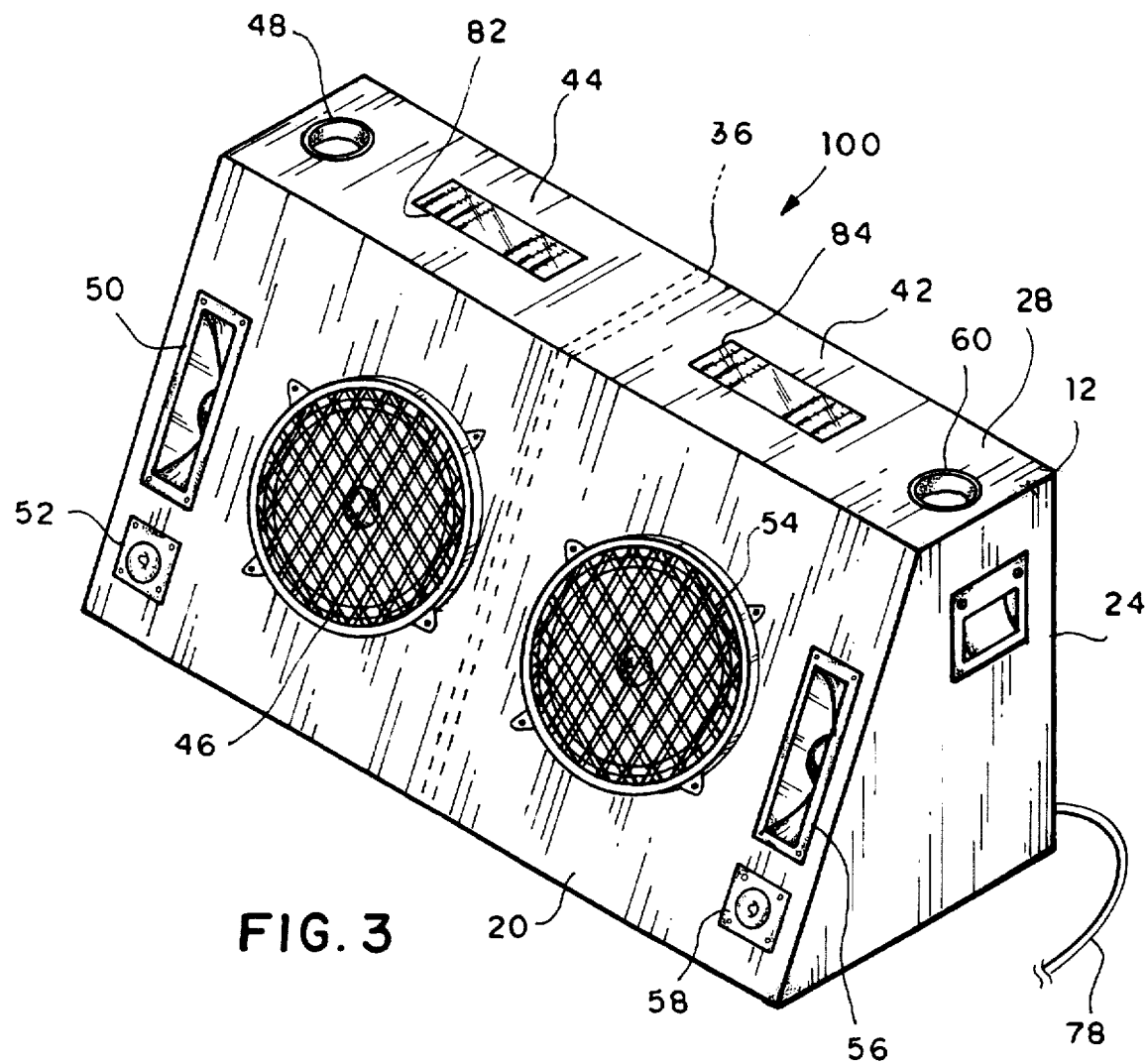
FIG. 3 is an isometric rear view of a second embodiment.

As shown in FIG. 3, a unit 100 forming a second embodiment of the present invention includes the right port 48 and the left port 60 placed on the top cover 28 of the respective right hand side 44 and left hand side 42 of the cabinet 12. Further, a pair of light emitting diode indicators 82 and 84 for indicating signal strength of a stereo channel is provided on the top cover. Light emitting diode indicator 82 is located on the right hand side 44 of the cabinet 12 and light emitting diode 84 is located on the left hand side 42 of the cabinet 12.

Figure 4:
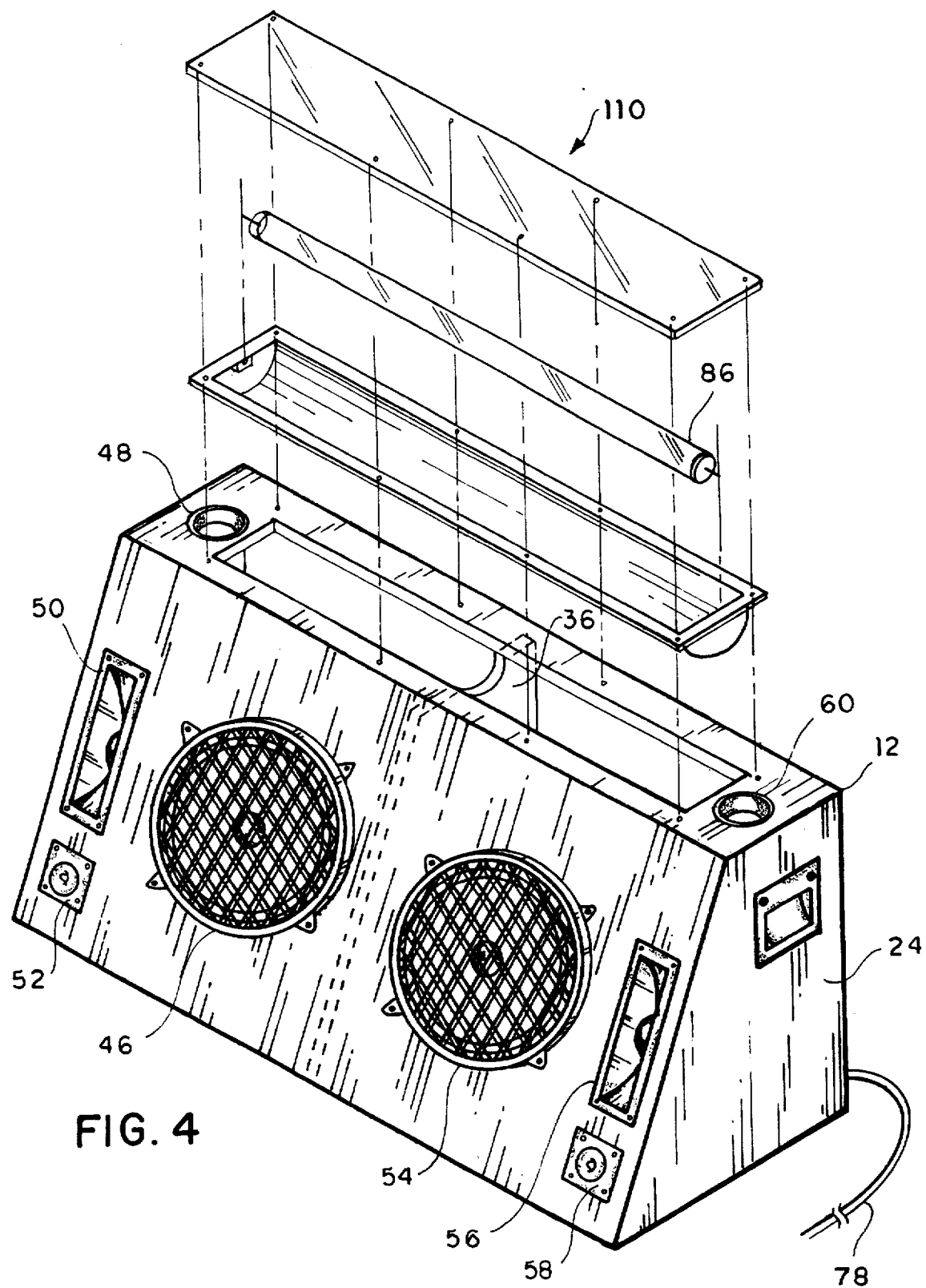
FIG. 4 is an exploded isometric front view of a third embodiment.
Figure 5:
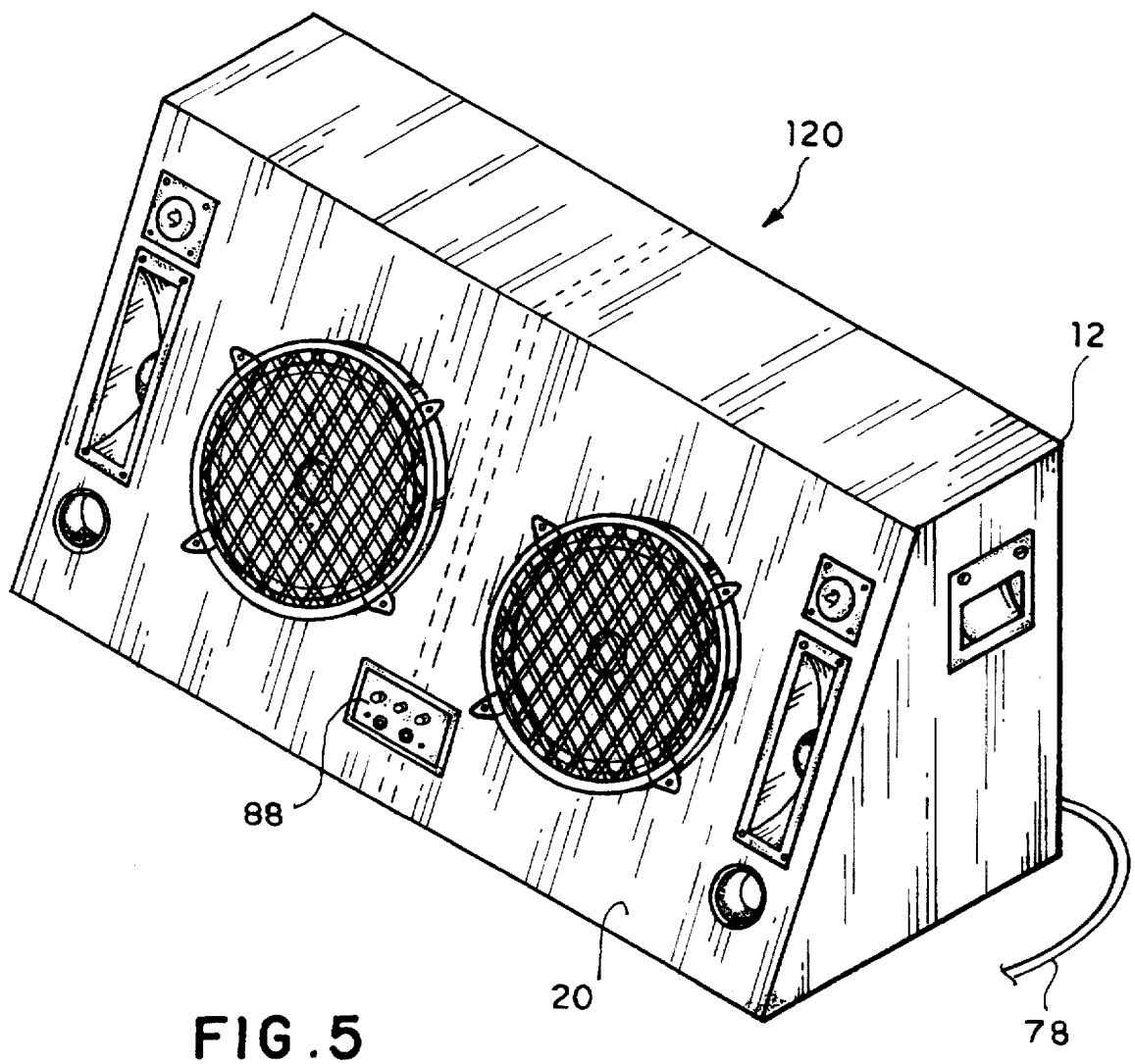
FIG. 5 is a isometric front view of a fourth embodiment.

As shown in FIG. 4, a unit 110 forming a third embodiment of the present invention includes a lamp 86 located on the top cover, and a fourth embodiment of the present invention as illustrated in FIG. 5, provides a microphone plug input 88 located on the front wall 20 for allowing a user to connect a microphone thereto for amplifying his or her own voice along with the music supplied to the unit 120.

It is to be understood that the present invention is not limited to the sole embodiment described above, but encompasses any and all embodiments within the scope of the following claims.

I claim:

1. A portable speaker and amplifier unit for use in a vehicle comprising:

a cabinet having an outer housing for separating an interior section of said cabinet from an exterior thereof, said outer housing including an inclined front wall, a vertical back wall, a vertical left side wall, a vertical right side wall, a horizontal top cover, and a horizontal bottom base;

an interiorly disposed vertical wall located midway between said right side wall and said left side wall so as to divide said interior section of said cabinet completely into a left chamber located within a left side of said cabinet and a right chamber located within a right side of said cabinet;

three front wall cutout sections on said left side extending through said inclined front wall from the exterior of said cabinet to said left chamber, wherein an equal number of said three front wall cutout sections extend from the exterior of said cabinet into said right chamber;

three speakers consisting of a woofer, a midrange speaker and a tweeter positioned on each of said left and right sides of said cabinet, each speaker having a front side and a back side, and each speaker being mounted on said inclined front wall over each said front wall cutout section, so that said front side thereof is located on the exterior of said cabinet and the back side thereof is located within said interior section of said cabinet; and, an audio power booster amplifier attached to said portable speaker and amplifier unit on said back wall.

2. A portable speaker and amplifier unit according to claim 1, wherein said portable speaker amplifier further comprises:

a first speaker wire receptacle located on said back wall on said right side of said cabinet;

a second speaker wire receptacle located on said back wall on said left side of said cabinet;

a power cord attached to said power booster amplifier for receiving electrical power;

a right channel stereo input wire of said audio power booster amplifier connected to said first speaker wire receptacle;

a left channel stereo input wire of said power booster amplifier connected to said second speaker wire receptacle;

a left channel stereo output wire of said power booster amplifier for providing amplification of an audio signal received by said left channel stereo input wire to said left woofer, said left midrange speaker, and said left tweeter when electrical power is received by said power cord; and a right channel stereo output wire of said power booster amplifier for providing amplification of an audio signal received by said right channel stereo input wire to said right woofer, right midrange speaker, and right tweeter when electrical power is received by said power cord.

3. A portable speaker and amplifier unit according to claim 2, further comprising a cigarette lighter adaptor plug attached to said power cord.

4. A portable speaker and amplifier unit according to claim 2, further comprising a left venting port in said front wall on said left side of said cabinet and a right venting port in said right wall on said right side of said cabinet.

5. A portable speaker and amplifier unit according to claim 2, further comprising a left venting port in said top cover on said left side of said cabinet and a right venting port in said top cover on said right side of said cabinet.

6. A portable speaker and amplifier unit according to claim 2, further comprising a plurality of left light emitting diode indicators attached to said left side of said cabinet on said top cover thereof and a plurality of right light emitting diode indicators attached to said right side of said cabinet on said top cover thereof.

7. A portable speaker and amplifier unit according to claim 2, further comprising a lamp attached to said top cover of said cabinet.

8. A portable speaker and amplifier unit claim 1, further comprising:

a base plate attached to said audio power booster amplifier; and a back wall cutout extending from the exterior of said cabinet, through said back wall thereof, and into selectively one of said left chamber and said right chamber, wherein said base plate of said audio power booster amplifier is mounted over said back wall cutout.

* * * * *